(12) United States Patent
Hanson et al.

(10) Patent No.: US 11,015,032 B2
(45) Date of Patent: May 25, 2021

(54) PHOTOACTIVE POLYMER COATINGS

(71) Applicant: Seton Hall University, South Orange, NJ (US)

(72) Inventors: James E. Hanson, Chester, NJ (US); Abdul Azeez, Irvington, NJ (US); Sergiu M. Gorun, New York, NY (US)

(73) Assignee: Seton Hall University, South Orange, NJ (US)

( * ) Notice: Subject to any disclaimer, the term of this patent is extended or adjusted under 35 U.S.C. 154(b) by 0 days.

(21) Appl. No.: 16/289,169

(22) Filed: Feb. 28, 2019

(65) Prior Publication Data
US 2019/0270858 A1    Sep. 5, 2019

Related U.S. Application Data

(60) Provisional application No. 62/637,445, filed on Mar. 2, 2018.

(51) Int. Cl.
| C09D 127/16 | (2006.01) |
| C08J 9/00 | (2006.01) |
| C09D 183/04 | (2006.01) |
| C08K 9/12 | (2006.01) |
| C08K 5/56 | (2006.01) |
| C08K 5/00 | (2006.01) |

(52) U.S. Cl.
CPC .......... C08J 9/0052 (2013.01); C08K 9/12 (2013.01); C09D 127/16 (2013.01); C09D 183/04 (2013.01); C08J 2327/16 (2013.01); C08J 2383/04 (2013.01); C08K 5/0091 (2013.01); C08K 5/56 (2013.01)

(58) Field of Classification Search
CPC .......................... C09D 127/16; C08J 2327/16
See application file for complete search history.

(56) References Cited

U.S. PATENT DOCUMENTS

| 4,806,291 | A | * | 2/1989 | Susa | .................. | B01D 67/0011 |
| | | | | | | 210/500.42 |
| 5,545,220 | A | * | 8/1996 | Andrews | .................... | A61F 2/12 |
| | | | | | | 427/2.24 |
| 8,475,581 | B2 | | 7/2013 | Stratton et al. | | |
| 2007/0054971 | A1 | * | 3/2007 | Hiroshige | .............. | C08J 9/0066 |
| | | | | | | 521/60 |
| 2010/0304120 | A1 | * | 12/2010 | Tokudome | .............. | C03C 17/30 |
| | | | | | | 428/304.4 |
| 2013/0112567 | A1 | * | 5/2013 | Ozawa | ................... | G02B 1/118 |
| | | | | | | 205/328 |
| 2015/0225290 | A1 | * | 8/2015 | Lee | ..................... | D06M 13/513 |
| | | | | | | 216/7 |
| 2015/0284592 | A1 | * | 10/2015 | Gorun | ..................... | C09D 7/41 |
| | | | | | | 524/88 |
| 2016/0251574 | A1 | | 9/2016 | Buissette et al. | | |
| 2017/0335128 | A1 | * | 11/2017 | Xue | ..................... | C09D 133/16 |
| 2019/0127548 | A1 | * | 5/2019 | Hosein | ....................... | C08J 9/28 |

FOREIGN PATENT DOCUMENTS

| CN | 104774511 | * | 7/2015 |
| WO | 2005083013 A1 | | 9/2005 |
| WO | 2005083014 A1 | | 9/2005 |
| WO | 2006030250 A2 | | 3/2006 |

OTHER PUBLICATIONS

Abstract for CN 106336668 (Jan. 2017).*
Gregory P. Industrial applications of phthalocyanines. Journal of porphyrins and phthalocyanines. Apr. 17, 2012; 6 pages.
Bench BA, Beveridge A, Sharman WM, Diebold GJ, van Lier JE, Gorun SM. Introduction of bulky perfluoroalkyl groups at the periphery of zinc perfluorophthalocyanine: chemical, structural, electronic, and preliminary photophysical and biological effects. Angewandte Chemie. Mar. 1, 2002; 41 (5):747-750.

* cited by examiner

*Primary Examiner* — Marc S Zimmer
(74) *Attorney, Agent, or Firm* — Lerner, David, Littenberg, Krumholz & Mentlik, LLP

(57) ABSTRACT

Photoactive polymer coatings and methods of making the same are disclosed herein. In some embodiments, a polymer coating comprises a polymer matrix having a porous structure extending throughout the polymer matrix, wherein the porous structure is present at an exposed surface of the polymer coating creating a roughened surface, and a modified support particle disposed within the polymer matrix, wherein the modified support particle includes a substituted phthalocyanine and a support particle. In some embodiments, the substituted phthalocyanine is a halogenated phthalocyanine.

9 Claims, 9 Drawing Sheets

PHOTOACTIVE POLYMER COATINGS

CROSS-REFERENCE TO RELATED APPLICATIONS

This application claims the benefit of the filing date of U.S. Provisional Patent Application No. 62/637,445, filed Mar. 2, 2018, the disclosure of which is hereby incorporated herein by reference.

FIELD OF THE INVENTION

The present invention generally relates to coating compositions and their subsequent deposition on a substrate. The coatings are photocatalytic, imparting to the surface of the substrate self-cleaning properties.

BACKGROUND OF THE INVENTION

A photooxidizer, such as titanium dioxide, has the property of exhibiting charge separation upon illumination with near-UV or ultraviolet (UV) radiation. Upon illumination, electrons are promoted from the valence band to the conduction band creating reactive electron-hole pairs that reduce oxygen to produce superoxide radicals and oxidize adsorbed water to produce reactive hydroxyl radicals, respectively. The holes have radical-cation character. All radicals have the ability to degrade the C—H bonds of organic compounds, such as those present in mildew, mold, algae, grease, etc., thus imparting cleaning and self-cleaning properties to a material containing the photooxidizer. As such, the incorporation of a photooxidizer into certain coatings will result in coatings that advantageously will retain self-cleaning properties.

The importance of clean coatings extends into corrosion aspects since organic and biological molecules attached to a surface can generate acids and other substances that, unless removed, can favor the onset of chemical and/or biological corrosion of metal surfaces. Certain organic molecules attached to photooxidizers may have beneficial effects on certain properties that rely upon charge separations, for example for solar energy conversion, but regular organic molecules are inefficient since they themselves contain C—H bonds, and thus are subject to degradation by radicals.

It should be noted that several publications provide compositions that include photocatalytic $TiO_2$, such as WO2005/083014, WO 2006/030250, WO 2005/083013 and U.S. Pat. No. 8,475,581. However, the photocatalytic $TiO_2$ in these publications fails to absorb radiation in the visible region of the solar spectrum, which is the region of the solar spectrum that contains the majority of the solar energy. Photocatalytic $TiO_2$ also accelerates degradation of compositions that contain weak C—H bonds due to the formation of electron-hole pairs.

Moreover, in as much as photooxidizers, such as photocatalytic $TiO_2$, have been used in combinations with polymers, for example, such as a latex paint or the like, these polymeric films lack sufficient self-cleaning abilities.

BRIEF SUMMARY OF THE INVENTION

A polymer coating and methods of making the same are disclosed herein. The polymer coating includes properties that facilitate self-cleaning, such as hydrophobic and/or oleophobic surfaces and, simultaneously, photooxidative properties that result in the generation of reactive oxygen species (ROS).

A polymer coating can comprise a polymer matrix having a porous structure extending throughout the polymer matrix, wherein the porous structure is also present on an exposed surface of the polymer film creating a roughened surface, and modified support particles dispersed within the polymer matrix, wherein the modified support particles include a substituted phthalocyanine and a support particle.

The coatings contain modified support particles, where the modified support particles include a halogenated phthalocyanine supported on support particles and the modified supported particles are dispersed within a polymer matrix. The polymer matrix includes a porous structure extending in three dimensions of the matrix such that the matrix has a roughened exposed surface. Moreover, if the exposed surface of the matrix is worn down, for example, by exposure to the elements, abrasion, etc., the newly exposed underlying surface of the matrix is also roughened due to the three dimensional nature of the porous structure extending throughout the matrix. The roughened surface of the matrix provides a distinct advantage in terms of hydrophobicity and oleophobicity of the coating.

A method of making a polymer coating can comprise depositing a composition onto the surface of a substrate to form the polymer coating, wherein the composition including modified support particles, a polymer, and solid particles, wherein the modified support particles include a substituted phthalocyanine and a support particle, and wherein the solid particles are volatilizable, and volatilizing the solid particles into a gaseous state to create a porous structure in the polymer coating, wherein the porous structure extends throughout the polymer coating and on the exposed surface of the polymer coating to create a roughened surface.

Additional features and advantages of the present invention are set forth in, or are apparent from the drawings that follow.

To aid in the understanding of the subject invention, the following examples are provided as illustrative thereof; however, they are merely examples and should not be construed as limitations on the claims.

DETAILED DESCRIPTION

Polymer coatings and methods of making the same are disclosed herein. The polymer coatings incorporate photocatalytic materials capable of generating reactive oxygen species (ROS), such as singlet oxygen, and also exhibit controlled surface properties that impart hydrophobic and possible oleophobic properties. Advantageously, contaminants can be removed via a synergistic double mode of action: water can be rejected due to the hydrophobicity of the polymer, and organic hydrophilic molecules may not adhere while any fraction that may adhere (loosely) can be made more hydrophilic or deeply oxidized (mineralized) by the ROS. Hydrophobic molecules may be rejected by oleophobic properties of the coating and/or oxidized by the ROS and converted into hydrophilic molecules and thus rejected. Advantageously, the coatings require only light and air for self cleaning properties to be realized, and thus are a "green", self-cleaning material.

Moreover, in as much as photooxidizers, such as $TiO_2$, have been used in combinations with polymers, for example, such as a latex paint or the like, these polymeric films lack the roughened surface features of the present invention, which further enhance the self-cleaning abilities of the coatings disclosed in the present application.

Protection of surfaces against water damage and contaminants is a long-standing effort. Protection of nonmetallic surfaces is also important. The potential significant savings in materials and labor are expected to have a broad societal impact too.

Figure 1:
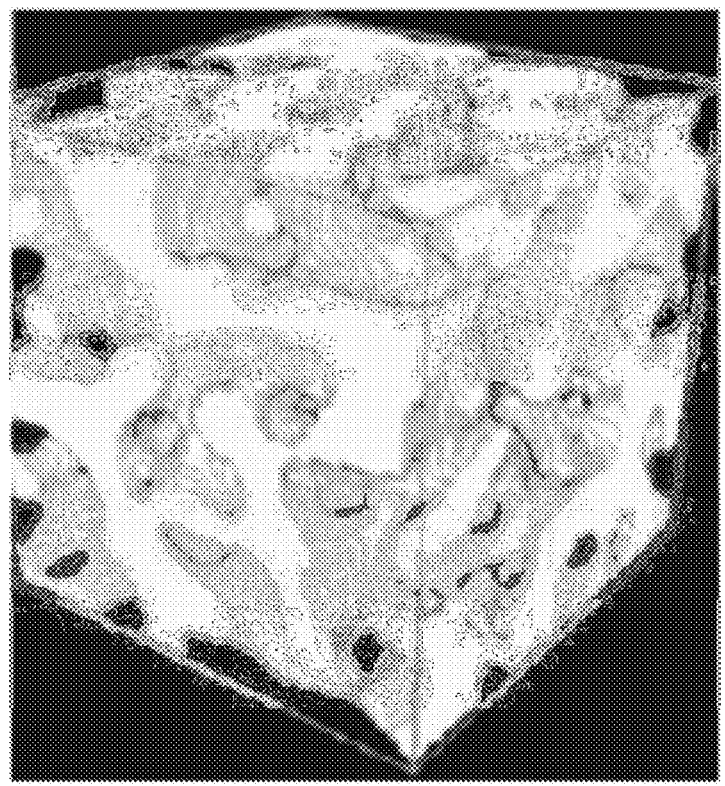
FIG. 1 depicts a three dimension schematic view of a polymer film in accordance with some embodiment of the present application.

The polymer coatings include a polymer matrix which spans dimensions of the film in all three directions, i.e., length, width, and thickness. The polymer matrix includes a porous structure extending throughout the polymer matrix. An exemplary polymer coating having a porous polymer matrix is illustrated in FIG. 1. As shown in FIG. 1, the porous structure, which is akin to voids in the polymer matrix, extends through the entire polymer coating in all dimensions. The exposed surface of the polymer coating is roughened due to the presence of the voids/porous structure thereon. Moreover, the porous structure is always present even if the exposed surface of the polymer film is removed, for example, by wearing, abrasion, or the like. The new surface that emerges upon removal of the exposed surface would also have a roughened surface due the presences of voids/porous structure extending throughout the polymer matrix.

The roughened surface can be used to control the surface hydrophobicity and/or oleophobicity of the polymer coating. The modification of surfaces to modulate hydrophobicity is well understood in theory and is an active area of exploration in practice. Surfaces that are essentially hydrophobic can increase their hydrophobicity by modifications to generate roughness on the appropriate scale—usually around 1-100 microns. A classic example of appropriate surface roughness is found in natural systems, for example leaves that are not wetted by water, such lotus leaf.

Modified support particles are included throughout the polymer matrix. As discussed herein, the modified support particles contribute to the self-cleaning features of the polymer coating.

Modified Support Particles

Modified support particles are disclosed herein. The modified support particles impart self-cleaning properties to the polymer film by forming reactive oxidizing species when illuminated. A modified support particle includes a halogenated phthalocyanine, or mixtures of phthalocyanines disposed on a support particle. The application of halogenated phthalocyanines onto support particles can result in the formation of new compositions which exhibit bonds not present within the support particle or halogenated phthalocyanines alone, but show useful reactivity. For example, the modified support particle can exhibit the reactivity of the halogenated phthalocyanines and that of the material of the support particles, if any activity is present for the support particle.

In one embodiment, the support particles include titanium dioxide, which results in a combined activity of the titanium dioxide and the halogenated phthalocyanine. Conversely, the use of a photochemically inert material in the support particles, such as oxides, for example silicon dioxide, magnesium oxide, zinc oxide, aluminum oxide, iron oxides, etc., or metal salts results in a composition in which only the phthalocyanine plays a photocatalytic role. Thus, the superior photocatalytic properties of the halogenated phthalocyanines manifest themselves in the presence of supports, either inert or reactive.

The modified support particles are fundamentally different from conventional materials, such as $TiO_2$. The modified support particles can have different physical and chemical properties, as well as photocatalytic properties compared to conventional materials. For example, the modified support particles are active under visible light illumination. This property is not affected by the presence of the support particle, even if chemical bonds are formed between the support particle and the metal center of the phthalocyanine on the support particle. Thus, the metal center of the phthalocyanine is not involved with the absorption of visible light. This property allows for variation of the support particles and thus advantageous generation of a number of different compositions of the modified support particles because only the phthalocyanine ligand (disposed on the support particle) absorbs light and generates ROS.

Halogenated Phthalocyanines

The halogenated phthalocyanines can be physisorbed and/or covalently bonded to the support particle. Exemplary phthalocyanine covalently bonded to support particles is described in U.S. application Ser. No. 15/055,502, which is incorporated herein by reference in its entirety. Phthalocyanine is an intensely colored aromatic macrocyclic compound that is widely used in dyeing. Phthalocyanines form coordination complexes with most elements of the periodic table, resulting in complexes that are also intensely colored and are used as dyes or pigments. For example, halogenated (chloro) copper phthalocyanine is one of the most important class of colorant and, according to the literature, the single largest-volume colorant sold, used in inks, the automotive industry, etc. [Peter Gregory, "Industrial applications of phthalocyanines" *Journal of Porphyrins and Phthalocyanines* Vol. 4, pp. 432-437 (2000)]

To improve the stability of a phthalocyanine in the presence of reactive oxidative species, the C—H bonds of a phthalocyanine dye are replaced with C—X bonds, where X is a halogen (e.g., F, Cl, Br, I), a perhaloalkyl groups (e.g., the phthalocyanine is substituted with groups containing —$C_nX_m$, where is a halogen, n is an integer from 1 to 12, and m=2n+1), or a mixture thereof. As such, halogenated phthalocyanine dyes (e.g., fluorinated phthalocyanines) exhibit an absence of C—H bonds (i.e., are completely free from C—H bonds) while absorbing strongly light in the visible region of the solar spectrum, in contrast to white titanium dioxides that can absorb light only in the UV or near UV regions or other white materials such as silicon dioxide, zinc oxide, magnesium oxide which absorbs light only in the UV region.

In one embodiment, the halogenated phthalocyanine(s) contain C—F bonds in place of C—H bonds (i.e., fluorinated phthalocyanine(s)). Without wishing to be bound by any particular theory, it is believed that the stability of the fluorinated phthalocyanine is enhanced through its conjugated structure that allows the electron withdrawing F atoms groups and —$C_nX_m$ groups to attract electrons from the organic phthalocyanine macrocycle central species, including metal cations that the phthalocyanine coordinates. Thus, the C—F bonds may have increased bond strength, while the central species, for example metal cations have an exaggerated positive charge, also known as enhanced Lewis acidity, which may increase the bond strength between the metal cations and the amine groups of the fluorinated phthalocyanine structure as well as to other species that may be bonded to the central species.

Generally, a halogenated phthalocyanine is represented by Formula 1 below:

(16R-Pc)$_n$ML$_o$ (Formula 1)

Each R is, independently, a halogen, such as F, Cl, Br, I, or a perhaloalkyl group, such as a perfluoroalkyl group such as a perfluoro methyl group, a perfluoro ethyl group, a perfluoro propyl group, and the like. Pc is a phthalocyanine moiety.

0<n<3 is the number of phthalocyanine units in the complex;

M is a cation, such as a cationic metal ion, such as $Zn^{2+}$, $Mg^{2+}$, $Ni^{2+}$, $Pd^{2+}$ or any other divalent main group or transition metal, or a trivalent, main group $Al^{3+}$, $Ga^{3+}$, or transition metal $V^{3+}$ or lanthanide element, such as, $La^{3+}$, or tetravalent cation such as $Ti^{4+}$, $Zr^{4+}$, or metal ions of higher valences. M can also be a non-metal, such as Si, P or 2 protons. L is an additional species, or combination of species cationic, anionic or neutral that may or may not coordinate with M and which, in certain embodiments, insures the overall electric neutrality of the complex. For example, given that the phthalocyanine ligand is a dianion, its complexes with divalent cations will be neutral and thus L could be a neutral species such as a solvent, including water. In the case of trivalent cations, L could be a combination of an anion, for example $Cl^-$ or $HO^-$ or $RO^-$ where R is an organic or inorganic fragment and a neutral ligand such as an organic solvent or water. R could be a part of an organic acid, such as a carboxylic acid, an inorganic acid, such as nitric acid, etc. In the case of tetravalent cations, for example $Ti^{4+}$, L could a combination of two mono anions, or a dianion and a neutral molecule. For example the titanyl, $TiO^{2+}$ oxocation is known to be coordinated by phthalocyanines. Similarly the vanadyl, $VO^{2+}$ oxocation, where V is tetravalent can be coordinated by phthalocyanines and an additional neutral ligand, for example water, can bind to the metal center. In addition, non-metals, for example Si can bind additional ligands. Thus, Si(IV) is known to be coordinated by phthalocyanines and, additionally coordinate two $Cl^-$ anions, or two hydroxide anions, $HO^-$. These anions can be replaced by other anions or further reacted with other molecules, for example acids or alcohols to produce a variety of L ligands.

Thus, the subscript "o" in $L_o$ is the number of species L, similar or different. In most embodiments, o is in the range of 0 to 8 (e.g., 0≤o≤8, such as 0≤o≤4).

Figure 2:
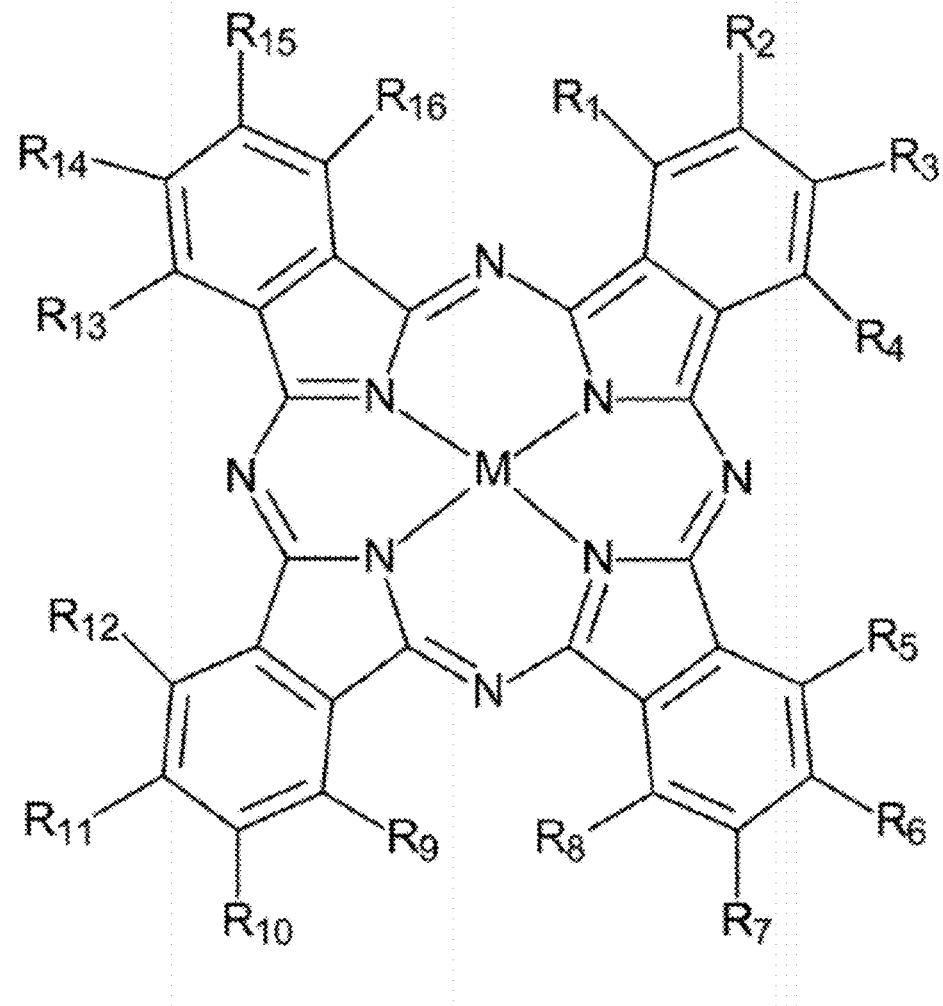
FIG. 2 depicts a phthalocyanine compound in accordance with some embodiments of the present application.
Figure 3:
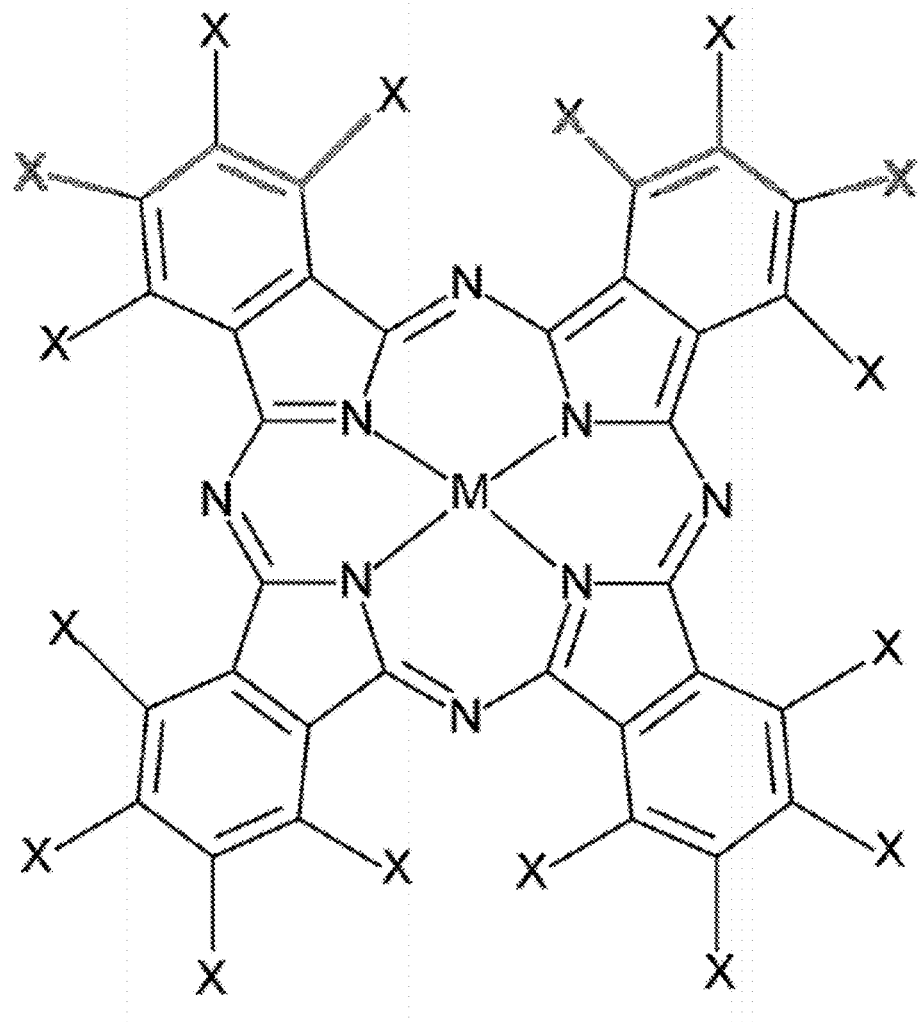
FIG. 3 depicts a phthalocyanine compound in accordance with some embodiments of the present application.
Figure 4:
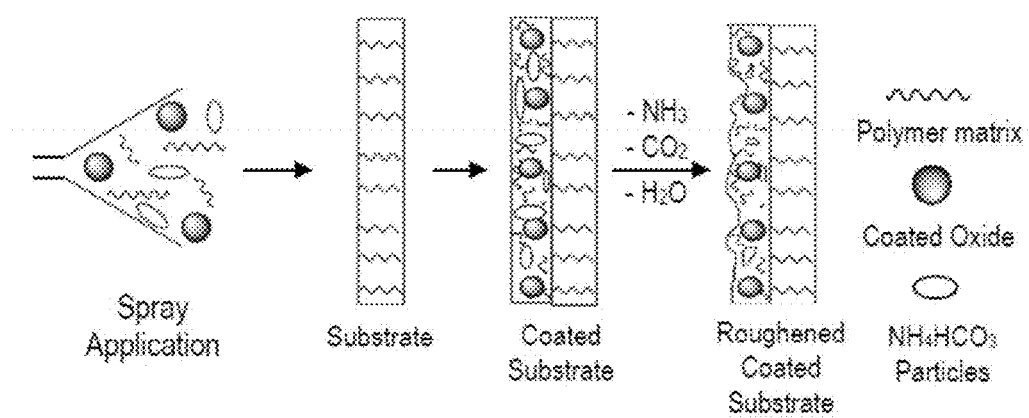
FIG. 4 depicts the stages of formation of a polymer film in accordance with some embodiments of the present application.

The halogenated phthalocyanine represented by Formula 1 is structurally depicted in FIG. 2. For simplicity, FIG. 3 shows a general chemical structure of a single phthalocyanine attached to a central cation M (i.e., n=1). However, it is to be understood that the structure of FIG. 2 is not limited to n=1. That is, 1≤n≤2 as described with respect to Formula 1.

In FIG. 2, Pc (i.e., the phthalocyanine moiety) is represented by all but $R_1$ through $R_{16}$ and M. Each R group is independently selected from the other R groups. Thus, in some embodiments, one or more halogens can be bonded directly to the Pc moiety in combination with one or more perhaloalkyl groups.

One embodiment of the halogenated phthalocyanine is represented by Formula 2 below:

[X$_m$(R$_x$)$_z$Pc]$_n$ML$_o$ (Formula 2)

1≤n≤2, which indicates the number of phthalocyanine units in the complex.

X is a halogen, such as F, Cl, Br, and I.

0≤m≤16, which indicates the number of halogen atoms directly bonded to the phthalocyanine compound.

$R_x$ is a perhaloalkyl group, such as a perfluoroalkyl group, with each $R_x$ group being independent from any other $R_x$ groups in the molecule.

0≤z≤16, which indicates the number of perhaloalkyl groups.

m+z=16.

M is a cationic ion, and can be represented by any of the M described herein with respect to Formula 1.

L is an additional species, cationic, anionic or neutral that may or may not coordinate M, and can be represented by any of the L described herein with respect to Formula 1.

o is the number of species L and may be chosen such that the overall charge of the complex is zero. In most embodiments, o is 0 to 8 (e.g., 1≤o≤8, such as 1≤o≤4) In addition, other groups may coordinate the cation in order to insure overall charge neutrality, for example a hydroxyl anion may coordinate an aluminum trivalent cation. These groups are also represented by L.

FIG. 3 shows one particular embodiment of the structure of FIG. 2, where all of the R groups are a halogen. That is, each R is a halogen when referring to Formula 1 above, and z is 0 when referring to Formula 2 above with X being F.

It should be noted, as it is well known in the chemistry literature that in solution there is possible to have exchange of L groups in the presence of certain solvents and other species. Thus, Formula 2 represents an average structure of several species that may coexist simultaneously. In contrast, as shown below, the chemical composition of materials in the solid-state is well defined as chemical exchanges are unlikely.

In solid-state, the halogenated phthalocyanine represented by Formula 1 can be represented by the general formula:

[(16R-Pc)$_n$ML$_o$(Q$_p$)$_q$]Z$_r$W$_s$ (Formula 3)

R, Pc, n, M, L, and o are defined above with respect to Formula 1.

Q is a ligand attached to (e.g., ionic bonded, covalent bonded, or the like) the cationic ion M, which may be situated on one or both sides of the complex.

p is the number of components of an individual ligand in the complex.

$0 \leq q \leq 8$, which is the number of ligands in the complex (e.g., $0 \leq q \leq 4$).

Z is a counter-ion that renders the charge of the entire complex to zero, and can be an anion or a cation dependent on the charge to be balanced.

$0 \leq r \leq 8$, which is the number of counter-ions (Z) in the complex in the complex.

W is a molecule or molecules of solvation, such as a ketone, alcohol, amine, ester, etc.).

$0 \leq s \leq 40$, which is the number of molecules of solvation in the solid-state structure of the complex.

Similarly, the halogenated phthalocyanine represented by Formula 2 can be represented by the general formula:

   (Formula 4)

X, $m$, $R_x$, z, Pc, n, M, L, and o are defined above with respect to Formula 2.

Q is a ligand attached to (e.g., ionic bonded, covalent bonded, and the like) the cationic ion M, which may be situated on one or both sides of the complex.

p is the number of components of an individual ligand in the complex.

$0 \leq q \leq 8$, which is the number of ligands in the complex (e.g., $0 \leq q \leq 4$).

Z is a counter-ion that renders the charge of the entire complex to zero, and can be an anion or a cation dependent on the charge to be balanced.

$0 \leq r \leq 8$, which is the number of counter-ions (Z) in the complex in the complex.

W is a molecule or molecules of solvation, such as a ketone, alcohol, amine, ester, and the like).

$0 \leq s \leq 40$, which is the number of molecules of solvation in the solid-state structure of the complex.

Referring again to FIG. 2, one exemplary embodiment of the halogenated phthalocyanine is described with each of $R_1$, $R_4$, $R_5$, $R_8$, $R_9$, $R_{12}$, $R_{13}$, and $R_{16}$, being a halogen (e.g., F) while each of $R_2$, $R_3$, $R_6$, $R_7$, $R_{10}$, $R_{11}$, $R_{14}$, and $R_{15}$ is, independently, a halogen or a perhaloalkyl group. For example, the groups $R_2$, $R_3$, $R_6$, $R_7$, $R_{10}$, $R_{11}$, $R_{14}$, and $R_{15}$ can be, independently, a perhalomethyl group (e.g., a perfluoromethyl group), a perhaloethyl group (e.g., a perfluoroethyl group), a perhalopropyl group (e.g., iso-$C_3X_7$, perhalo isopropyl), and the like.

One exemplary embodiment of a halogenated phthalocyanine is obtained from Formula 3 above when eight of the R groups are F and eight of the R groups are perfluoroisopropyl groups, n=1, M is Zn(II), o=1, p=0, q=0, r=0 and s=0. In this embodiment, the halogenated phthalocyanine contains 64 fluorine atoms: 1F in each of the eight R groups that are F and 7F in each of the eight perfluoroisopropyl groups, which leads to (1F*8)+(7F*8)=64F, and may be designated "$F_{64}PcZn$" in shorthand. This embodiment is easily understood with reference to Formula 2 above, where each X is F; m is 8; each $R_x$ is a perfluoroisopropyl group; z is 8; n=1, M is Zn(II), and o=1.

It should be noted that in the solid state the same composition exist, with reference to Formula 3 where eight of the R groups are F and eight of the R groups are perfluoroisopropyl groups, n=1, M=Zn(II), o=0, Q=methanol or acetone, p=2, q=1, r=0 and s=0. It is also known in the art that in solution ligands L and Q may exchange, thus the composition in solution is abbreviated $F_{64}PcZn$. Moreover, once a solvated fluorophthalocyanine is deposited on a support particle, such as $TiO_2$, volatile molecules may evaporate, re-setting the p, q, r and s coefficients in Formula 3, possibly to zero. If the evaporation is incomplete, the coefficient may acquire fractional values. In any case, this variability does not significantly affect the functionality of the halogenated phthalocyanines and it is known in the art that heating the claimed compositions below their decomposition points, including under vacuum, may remove volatile molecules, thereby lowering further the values of p, q, r and s.

The halogenated phthalocyanines are thermally resistant at least until about 300° C. Further, halogenated phthalocyanines can be chemically and photochemically resistant, and also may be insoluble in water and other solvent.

Support Particles

The support particles can be in the form of microparticles and/or nanoparticles. The support particles can have a size of about 10 nm to about 100 microns. In one particular embodiment, the support particles are nanoparticles having an average size of about 10 nm to about 150 nm (e.g., about 10 nm to about 100 nm).

The support particle can be made of any number of materials, such as non-metals, for example carbon, metals, metal cations combined with anions such as oxides, hydroxides, borates, sulfides, silicates, carbonates, carbides, nitrates, sulfates, sulfonates, chlorides, fluorides, and the like. Many anions formed from elements or combinations of elements can be contemplated for the support particles. Exemplary combinations of anions can be oxy-hydroxides, hydroxyl silicates, or the like. Many of these combinations are known to occur in minerals.

Exemplary oxides, can include, but are not limited to, silicon oxide ($SiO_2$), metal oxides (e.g., titanium oxide ($TiO_2$)), aluminum oxide ($Al_2O_3$), zinc oxide (ZnO), iron oxides (e.g., FeO, $Fe_2O_3$, $Fe_3O_4$), zirconium oxide ($ZrO_2$), oxides of lanthanides, or mixtures thereof.

A variety of phases of oxides can be used, in various degrees of dispersion and particle size. For example, when the oxide includes $TiO_2$, the support particles can contain $TiO_2$ in large extent in an anatase crystalline form. For example, about 95% or more (by volume) of the titanium oxide particles can be in the anatase crystalline form.

Other inert materials may be included in the support particles, either in addition to an oxide or in the alternative of an oxide. For example, the support particles may include carbon black, sulfides, carbonates, and the like.

Refractory materials may also be included as supports, for example glasses, polymers such as polytetrafluoroethylenes (PTFE), or other polymers resistant to degradation by reactive oxygen species.

Polymers

The polymers for the polymer film generally include those polymers that are at least resistant to oxidation by the products of the photooxidative activity of the coated particles. One exemplary class of polymers that can be used is polysiloxane polymers. The presence of silicon reduces the proportion of C—H bonds in the polymer and thus the susceptibility to degradation. However, it is contemplated that polymers having some C—H bonds may also be utilized, for example, to provide beneficial mechanical and other properties, but at the expense of chemical robustness. For instance, polyvinylidene fluoride (PVDF) which includes about a 50:50 ratio of C—H bonds to C—F bonds, is one exemplary carbon-based polymer that can be used. Additionally, polytetrafluoroethylene (PTFE), which has a similar structure to PVDF, except contains all C—F bonds, is another exemplary carbon-based polymer than can be used. Exemplary polymers can include alkyl polysiloxanes; aryl polysiloxanes; fluorinated polysiloxanes; PTFE; PVDF;

other fluoropolymers including polymers of hexafluoropropylene, perfluorocycloalkenes and perfluorovinyl ethers; perfluorinated sulfonate polymers such as Nafion; perfluoropolyoxetanes; copolymers of tetrafluoroethylene, vinylidene fluoride, hexafluoropropylene, perfluorovinyl ethers, perfluorocycloalkenes and other fluorinated monomers with non-fluorinated monomers; polystyrene and alpha methylpolystyrene; copolymers of styrene and alpha methyl styrene such as with maleic anhydride or maleimide; polyacrylates and polymethacrylates; polyacrylonitrile and perfluoropolyacrylonitrile; polyacrolein and polymethacrolein; polyethylene, polypropylene and other polyolefins including polybutadiene; phenol-formaldehyde resins; polyesters such as polyethylene terephthalate; polyamides such as nylons and polyaramids (Kevlar); polyethers such as polyethylene oxide, polysulfides such as polyphenylene sulfide; polysulfones, polyether ether ketones (PEEK); polyimides; polyurethanes; polycarbonates; ring opening polymers such as polynorbornene and hydrogenated forms of the same; inorganic polymers such as polyphosphazenes; natural and synthetic rubbers; polyamines such as polyethylene imine; polyoxazolines; carbohydrate polymers such as cellulose; polyacetylene; polypyrrole; polythiophenes; natural polymers such as proteins and other polymer materials capable of forming films.

In one embodiment, the polysiloxane polymer can have the general formula $[R_2SiO]_n$, where R is an organic group (e.g., an alkyl group such as methyl, ethyl, or phenyl) and n is the average number of repeating units in the polymer. Such polysiloxane polymers have an inorganic silicon-oxygen backbone (i.e., —Si—O—Si—O—Si—O—), with organic side groups attached to the silicon atoms. In some cases, organic side groups can be used to link two or more of these backbones together. By varying the —Si—O— chain lengths, side groups, and cross linking, polysiloxane polymers can be synthesized with a wide variety of properties and compositions. Particularly suitable polysiloxane polymers are disclosed in U.S. Patent Application Publication No. 2011/0144225, which is incorporated by reference herein.

Method of Making the Modified Support Particles

The coated particles can be made by adding the support particles to a solution containing a solvent and the halogenated phthalocyanine and subsequently evaporating the solvent. In certain embodiments, the support particles can be loaded with the halogenated phthalocyanine being at a concentration of about 0.1% to about 10% by weight of the total weight of the resulting coated particle.

Other methods of making coated particles can be utilized whereby the halogenated phthalocyanines are chemically linked to a support particle. Those methods are disclosed in U.S. application Ser. No. 15/055,502, which is incorporated herein by reference in its entirety.

Method of Making the Polymer Coating

A method of making the polymer coating includes volatilizing particles to generate the required surface roughness. Exemplary embodiments of the method are depicted in FIG. 5, where the modified support particles, the polymer, and solid particles that can be volatilized are incorporated into a composition that can be deposited on the surface of a substrate. The substrate can be material and/or structure that the polymer film is designed to protect, such as a metal surface of a water tank or the exterior wall of a house. The solid particles that can be volatilized can be, but are not limited to, ammonium carbonate ($NH_4HCO_3$), ammonium carbamate ($H_2NCO_2NH_4$), low ceiling temperature metastable polymer such as polyolefin sulfones and other polyvinyl sulfones, thermally and photochemically degradable molecules such as sulfolene or certain nitro and azido compounds, easily sublimed materials such as dry ice, and other materials that generate volatile gases on treatments such as heat, light, and various types of radiation. The solid particles range in size from about 1 micron to about 100 microns.

As depicted in FIG. 5, the composition including the polymer, the modified support particle, and the solid particles are applied to the substrate by spraying. The composition may be delivered to the substrate using a solvent. The composition may be dissolved or dispersed in the solvent in an amount ranging from 0.01 to 1 gram per 1 ml of solvent. Exemplary solvents can include dimethyl formamide (DMF), dimethyl sulfoxide, esters, alcohols, ketones and other volatile solvents. Exemplary types of spraying processes can include air-atomized, airless, high volume low pressure, and electrostatic. Spraying is one exemplary application process, and other application processes are possible. For example, alternative application processes can include dipping and brushing.

The modified support particles represent about 1 percent by weight (wt %) to about 30 wt % of the composition. The volatilizable solid particles could be used in about 1 wt % to about 40 wt % of the composition. The polymer may be present in about 30 to about 98 wt % of the composition. Once the volatilization occurs, the relative polymer proportion will increase. One exemplary composition may include about 1 g of polymer, 0.2 g of solid particles, and about 0.05 g of modified support particles. These amounts correspond to about 80 wt % polymer, about 16 wt % solid particles, and about 4 wt % modified support particles. Once the solid particles are volatilized to create a porous polymer matrix (discussed below), the polymer matrix may be about 95.25 wt % polymer and 4.75 wt % modified support particles in this exemplary embodiment.

Once the composition is coated on the substrate, the solid particles are volatilized to remove the solid particles resulting in a polymer matrix with a porous structure extending throughout the polymer matrix. The porous structure is present at the surface of the polymer matrix which results in a roughened surface of the polymer matrix. One exemplary solid particle that can be volatilized to form the polymer matrix is ammonium bicarbonate ($NH_4HCO_3$), which is a non-toxic salt that decomposes to water, carbon dioxide and ammonia starting at about 37° C. is represented. Alternatively, ammonium carbamate can be used since its facile decomposition at 60° C. also generates gaseous ammonia and carbon dioxide: $NH_2CO_2NH_4 \rightarrow 2NH_3 + CO_2$.

Volatilization can be accomplished, for example, by using heat, light, an electron beam, and the like. The polymer coating can have increased hydrophobicity due to the surface roughness created by the porous structure in the polymer matrix. Since the porous structure extends throughout the polymer matrix, the polymer coating can maintain the advantages of the roughened surface, for instance, when the initial exposed surface is scratched or worn down by exposure.

Figure 5A:
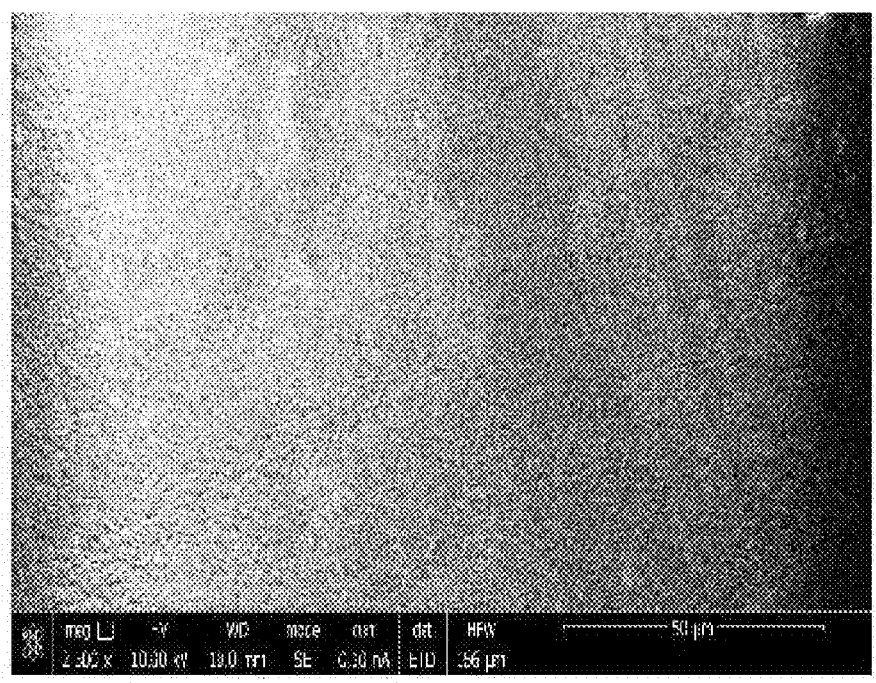
FIG. 5A depicts a scanning electron microscopy (SEM) micrograph of a polyvinylidene fluoride (PVDF) film in accordance with an embodiment of the present application.
Figure 5B:
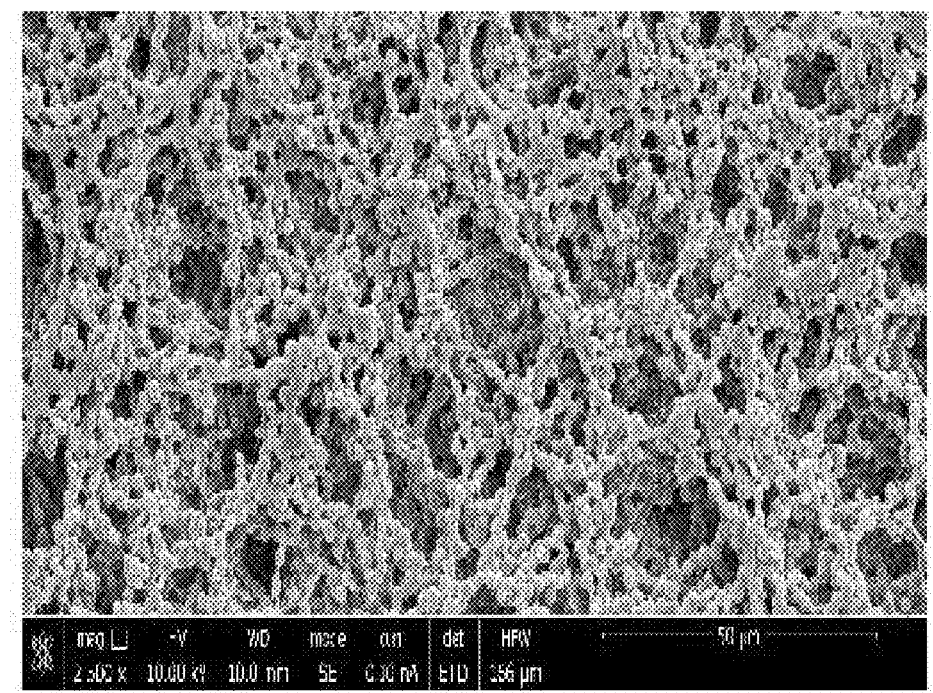
FIG. 5B depicts a SEM micrograph of a porous PVDF film in accordance with an embodiment of the present application.
Figure 5C:
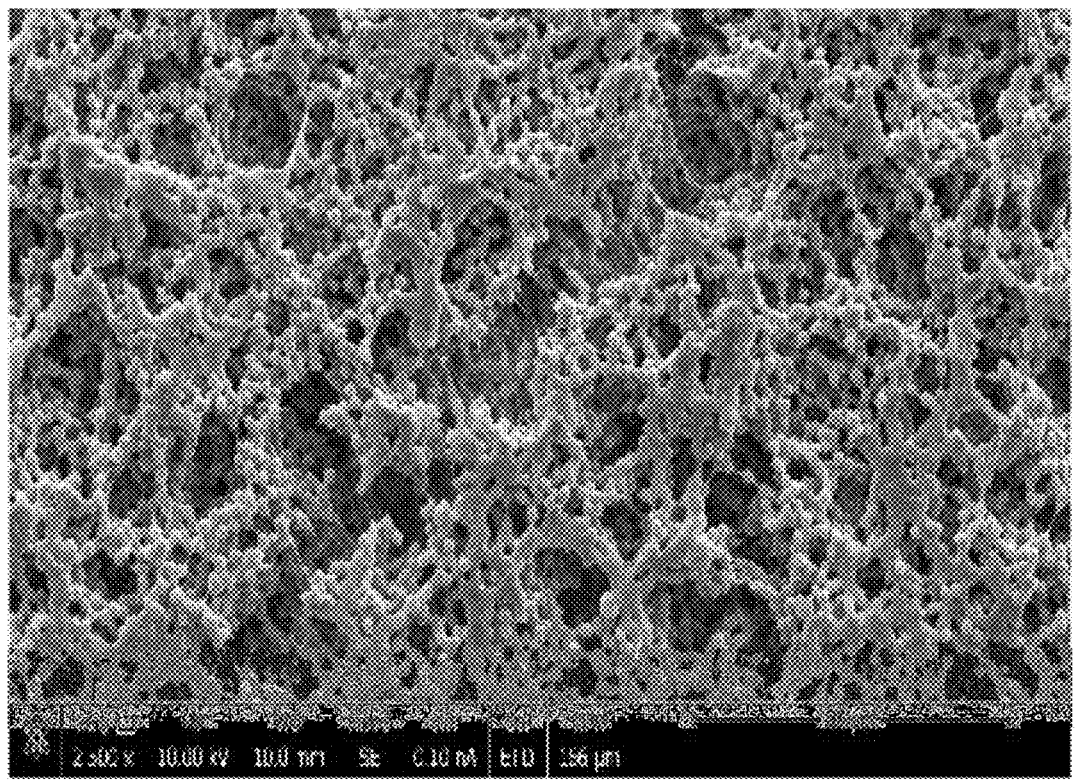
FIG. 5C depicts a SEM micrograph of a porous PVDF film that incorporates $F_{64}PcZn$ deposited on $TiO_2$ in accordance with an embodiment of the present application.

Exemplary embodiments shown in FIGS. 5A through 5C illustrate the effects of volatilizing the solid particles to generate a polymer matrix having a porous structure. FIG. 5A depicts a PVDF film where no solid particles have been added or volatilized. FIG. 5B depicts a PVDF film where solid particles have been added and volatized, but no modified support particles have been added. FIG. 5C depicts a PVDF film where solid particles have been added and volatized, and modified support particles have been added.

FIGS. 5A through 5C demonstrate increased roughness from the volatilization process and reveal the presence of a porous structure extending into the film.

EXAMPLES

Experimental Example 1—A Polymer Matrix Including Modified Support Particles

Examples 1 demonstrates the effects of methyl orange (MO) degradation in a PVDF polymer matrix that includes modified support particles (Example 1) in comparison to a PVDF polymer matrix which includes support particles, i.e., without a halogenated phthalocyanine (Comparative Example 1). The support particles are $TiO_2$, and the modified support particles use $TiO_2$ is used as a support particle and $F_{64}PcZn$ is used as a halogenated phthalocyanine. MO is used as a model dye to illustrate the production and utility of the reactive oxygen species (ROS). The ROS are known to degrade a variety of other molecules.

Example 1

$F_{64}PcZn$ was prepared as per "Introduction of Bulky Perfluoroalkyl Groups at the Periphery of Zinc Perfluoro Phthalocyanine: Chemical, Structural, Electronic, and Preliminary Photophysical and Biological Effects," B. Bench, A. Beveridge, W. Sharman, G. Diebold, J. van Lier, S. M. Gorun, *Angew. Chem. Int. Ed.*, 41, 748, 2002, which is incorporated herein by reference in its entirety. Commercially available $TiO_2$ nanoparticles (Degussa) with particle size of about 10-12 nm were loaded with 3 wt % of $F_{64}PcZn$. The loading was performed by adding $TiO_2$ nanoparticles to $F_{64}PcZn$ dissolved in ethanol and the subsequent evaporation of the solvent. The amount of $F_{64}PcZn$ loaded on $TiO_2$ nanoparticles was confirmed using UV-Vis spectrophotometric measurements by leaching out the $F_{64}PcZn$ with acetone and quantifying the amount of $F_{64}PcZn$ based on its known molecular extinction coefficient.

The $TiO_2$—$F_{64}PcZn$ modified support particles, PVDF, and $NH_4HCO_3$, were mixed in about 10 ml of dimethyl formamide (DMF) to form a composition. The $TiO_2$—$F_{64}PcZn$ was added in an amount of about 0.03 g. The PVDF was added in an amount of about 1.0 g. The $NH_4HCO_3$ was added in an amount of about 0.2 g. The composition was sprayed onto a glass substrate. The composition was air dried for about 6 hours. Then glass substrate and dried composition was heated to about 80° C. for about 48 hours to remove the solvent and volatilize the $NH_4HCO_3$ to form the polymer coating.

Comparative Example 1

Comparative Example 1 was made in the same manner as Example 1, except the modified support particles were replaced with $TiO_2$ particles (Degussa).

Figure 6:
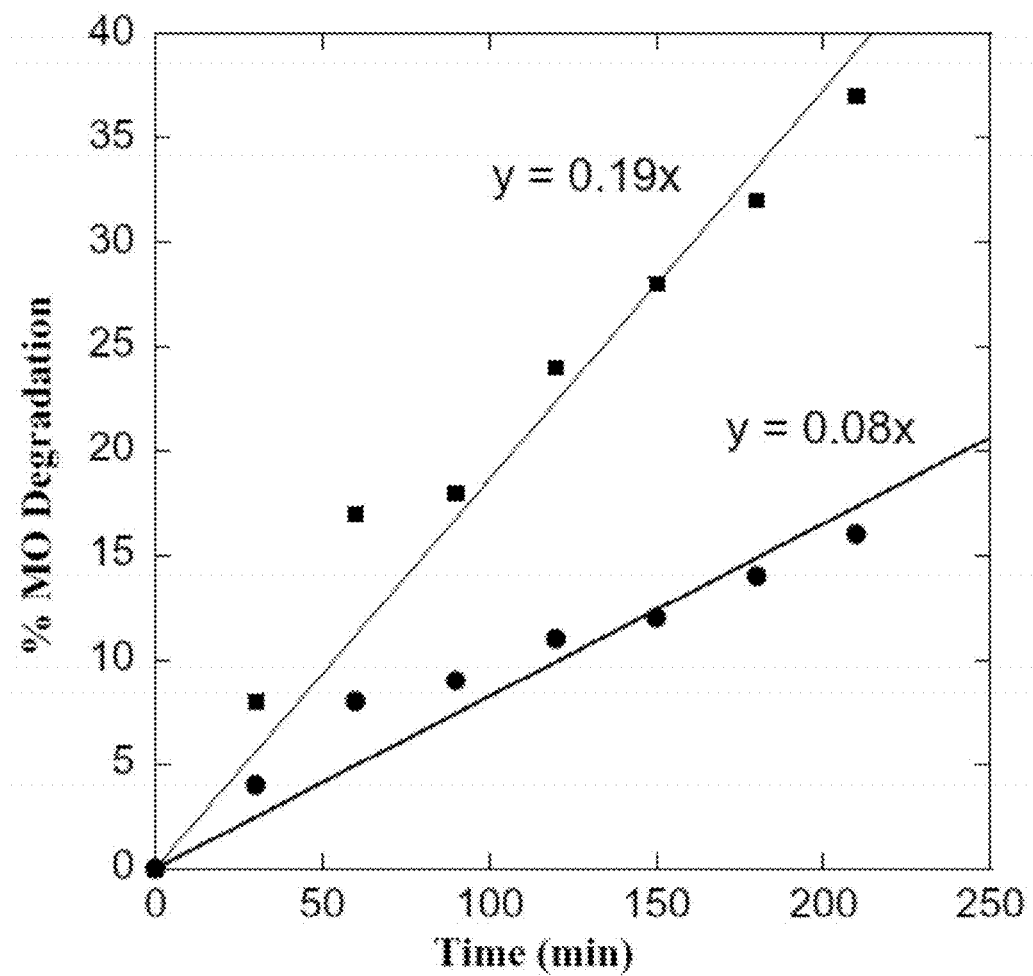
FIG. 6 depicts the time-dependent degradation of methyl orange (MO) by $TiO_2$ particles dispersed in PVDF, slope 0.08 and $TiO_2$ particles coated with $F_{64}PcZn$ and dispersed in PVDF, slope 0.19.

Example 1 and Comparative Example 1 were measured to demonstrate the effect of $F_{64}PcZn$ on methyl orange (MO) degradation in water. MO degradation was measured by separately inserted the glass substrates having the coatings of Example 1 and Comparative Example 1 disposed thereon in an aqueous solution of MO having a known concentration in the millimolar range. As shown in FIG. 6, the presence of $F_{64}PcZn$ in Example 1 (squares, slope of 0.19) more than doubles the rate of MO degradations observed in its absence in Comparative Example 1 (circles, slope of 0.8). The degradation rate remains the same when the PVDF matrix that contains the $TiO_2$-supported $F_{64}PcZn$ is subject to the roughening effect of gases generated by the decomposition of $NH_4HCO_3$, thus demonstrating that the added surface roughness does not hinder the catalytic activity imparted by the $TiO_2$-supported $F_{64}PcZn$.

Figure 7:
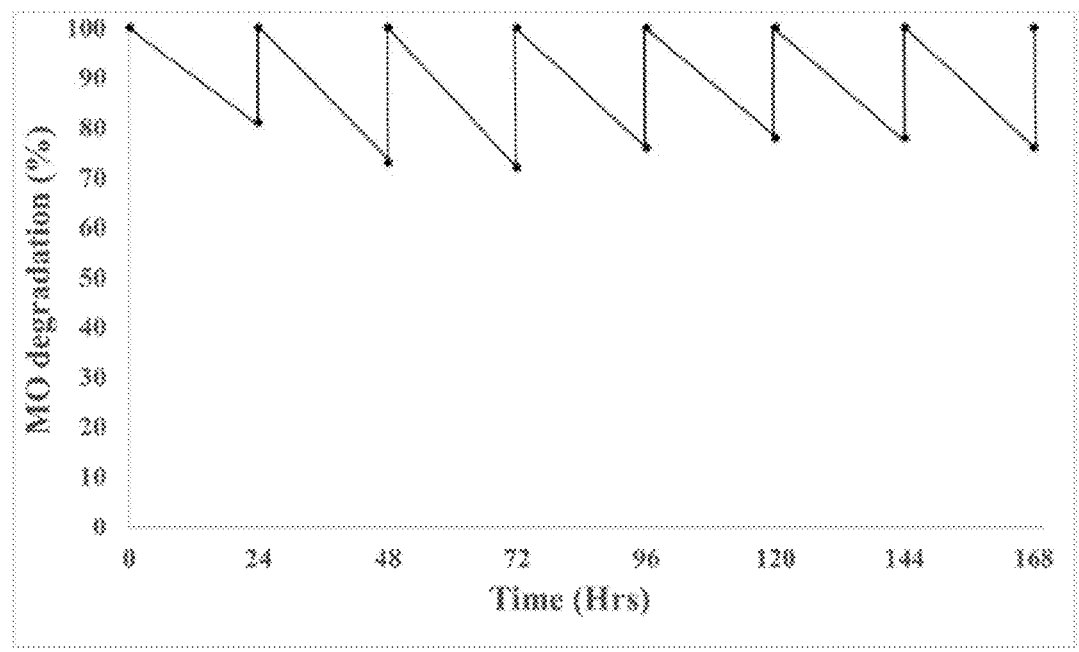
FIG. 7 depicts plots the methyl orange (MO) decomposition profile for 4 hrs for seven consecutive days. Invariable rates of MO decompositions are noted.
Figure 8:
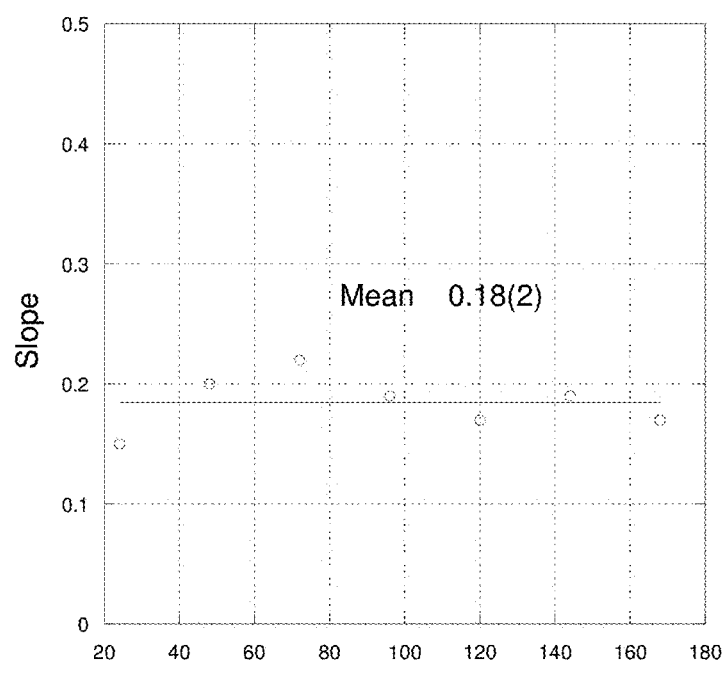
FIG. 8 depicts a plot of the slope of the time dependency MO decomposition revealing its constant value, within experimental errors.

Experimental Example 2—Stability of Modified Support Particles in a Polymer Matrix Experimental Example 2 uses the polymer coating of Example 1, and studies the stability of the $TiO_2/F_{64}PcZn$ modified support particle inside the polymer matrix under photocatalytic conditions. The polymer coating was repeatedly illuminated in the presence of MO for a 4 hour period each day for 7 consecutive days. A plot of the MO decomposition profile (FIG. 7) reveals invariable rates of MO decompositions for 7 days, which suggests that the $F_6PcZn$ and the polymer material is stable while maintaining its reactivity. A plot of the slope of the time dependency (FIG. 8), which is the rate of Mo decomposition, reveals its constant value, within experimental errors.

It will be understood by those skilled in the art that, although the subject invention has been described above in relation to embodiments thereof variations and modifications can be effected in these preferred embodiments without departing from the scope and spirit of the invention.

The invention claimed is:

1. A polymer coating, having a porous structure extending throughout the polymer coating, wherein the porous structure is present at an exposed surface of the polymer coating creating a roughened surface, wherein the polymer of the polymer coating consists of polyvinylidene fluoride (PVDF); and
   a modified support particle disposed within the polymer coating, wherein the modified support particle includes a substituted phthalocyanine and a support particle.

2. The polymer coating of claim 1, wherein the substituted phthalocyanine is a halogenated phthalocyanine.

3. The polymer coating of claim 1, wherein the substituted phthalocyanine is $F_{64}PcZn$.

4. A method of making a polymer coating, comprising:
   depositing a composition onto the surface of a substrate, wherein the composition includes modified support particles, polyvinylidene fluoride (PVDF), and solid particles, wherein the modified support particles include a substituted phthalocyanine and a support particle, and wherein the solid particles are volatilizable; and
   volatilizing the solid particles into a gaseous state to create a polymer coating having a porous structure, the polymer of the polymer coating consisting of PVDF, wherein the porous structures extends throughout the polymer coating and on the exposed surface of the polymer coating to create a roughened surface, and wherein the modified support particles are disposed within the polymer coating.

5. The method of claim 4, wherein the solid particles are selected from the group consisting of ammonium carbonate ($NH_4HCO_3$), ammonium carbamate ($H_2NCO_2NH_4$), and mixtures thereof.

6. The method of claim 4, wherein the substituted phthalocyanine is a halogenated phthalocyanine.

7. The method of claim 4, wherein the substituted phthalocyanine is $F_{64}PcZn$.

8. The method of claim 4, wherein the composition includes the modified support particles present in an amount ranging from about 1 percent by weight (wt %) to about 30 wt %, particles, the polymer present in an amount ranging from about 30 wt % to about 98 wt %, and solid particles present in an amount ranging from about 1 wt % to about 40 wt %, based on the total weight of the composition.

9. The method of claim 4, wherein the solid particles range in size from about 1 micron to about 100 microns.

* * * * *